US010392059B2

(12) United States Patent
Davis et al.

(10) Patent No.: US 10,392,059 B2
(45) Date of Patent: Aug. 27, 2019

(54) TRACKED VEHICLE SUSPENSION SYSTEMS AND METHODS

(71) Applicant: DELVE INTERNATIONAL INC., Centerville, UT (US)

(72) Inventors: Robert Dane Davis, North Ogden, UT (US); Tanner Reed Nielsen, Layton, UT (US); Darin Chase Nielsen, Cedar City, UT (US); Gregory Gene Nielsen, Centerville, UT (US)

(73) Assignee: DELVE INTERNATIONAL INC., Centerville, UT (US)

( * ) Notice: Subject to any disclaimer, the term of this patent is extended or adjusted under 35 U.S.C. 154(b) by 0 days.

(21) Appl. No.: 16/049,301

(22) Filed: Jul. 30, 2018

(65) Prior Publication Data

US 2018/0334206 A1   Nov. 22, 2018

Related U.S. Application Data

(63) Continuation of application No. 14/744,986, filed on Jun. 19, 2015, now Pat. No. 10,035,551.

(51) Int. Cl.
*B62D 55/108* (2006.01)
*B62D 55/06* (2006.01)
(Continued)

(52) U.S. Cl.
CPC .............. *B62D 55/108* (2013.01); *B60F 3/00* (2013.01); *B60F 3/0015* (2013.01); *B62D 55/06* (2013.01); *B62D 55/30* (2013.01)

(58) Field of Classification Search
CPC ...... B62D 55/108; B62D 55/06; B62D 55/30; B60F 3/0015; B60F 3/00
(Continued)

(56) References Cited

U.S. PATENT DOCUMENTS 2,284,821 A * 6/1942 Heaslet .................. B62D 55/30
305/130
2,506,360 A * 5/1950 Henning ................ B62D 55/30
267/75
(Continued)

FOREIGN PATENT DOCUMENTS

DE       102011051451 A1    1/2013
JP          2013071469 A  *  4/2013
(Continued)

OTHER PUBLICATIONS

PCT International Search Report for PCT International Application No. PCT/US2016/037260, dated Sep. 9, 2016.

*Primary Examiner* — S. Joseph Morano
*Assistant Examiner* — Jean W Charleston
(74) *Attorney, Agent, or Firm* — Dorsey & Whitney LLP

(57) ABSTRACT

A tracked vehicle has a pivotable suspension. The vehicle includes a vehicle frame, a motor configured to produce power for the vehicle, and left and right track assemblies that are each connected to the frame. The assemblies each have a drive wheel configured to be driven by the motor, an endless track driven by the drive wheel, wherein the endless track has an outer side and an inner side, a bogie positioned on the inner side of the endless track, a support wheel attached to the bogie and configured to roll on the endless track, a strut connected to the frame and to the bogie, and a shock absorber connected to the frame and to the strut. The strut and the shock absorber are pivotable relative to the frame. The vehicle may have low ground pressure, consistent traction, and may be modularly configured with a floatable hull for aquatic travel.

28 Claims, 14 Drawing Sheets

(51) Int. Cl.
  *B62D 55/30* (2006.01)
  *B60F 3/00* (2006.01)

(58) Field of Classification Search
  USPC ....... 301/130, 131, 132, 138, 143, 145, 146, 301/151, 152
  See application file for complete search history.

(56) References Cited

U.S. PATENT DOCUMENTS

| | | | | |
|---|---|---|---|---|
| 3,282,630 | A | * | 11/1966 | Harrison .............. B62D 55/244 |
| | | | | 305/167 |
| 3,948,331 | A | | 4/1976 | Esch |
| 4,568,294 | A | * | 2/1986 | Owsen .................. B60F 3/0015 |
| | | | | 114/313 |
| 5,246,246 | A | | 9/1993 | Kendall |
| 6,408,965 | B1 | * | 6/2002 | Grant .................... B62D 55/30 |
| | | | | 180/9.1 |
| 8,002,596 | B2 | | 8/2011 | Wernicke et al. |
| 8,474,554 | B2 | | 7/2013 | Howe et al. |
| 2005/0003715 | A1 | * | 1/2005 | Hewitt ................. B60F 3/0015 |
| | | | | 440/12.5 |
| 2005/0006715 | A1 | | 1/2005 | Kashiura |
| 2012/0242142 | A1 | * | 9/2012 | Kautsch ................ B62D 55/02 |
| | | | | 305/142 |
| 2015/0166133 | A1 | | 6/2015 | Eavenson et al. |
| 2015/0217818 | A1 | * | 8/2015 | Vik ...................... B62D 55/305 |
| | | | | 305/125 |

FOREIGN PATENT DOCUMENTS

| | | |
|---|---|---|
| JP | 2013071469 A | 4/2013 |
| WO | 2008035931 A1 | 3/2008 |
| WO | WO-2008035931 A1 * | 3/2008 ........... B62D 55/305 |

\* cited by examiner

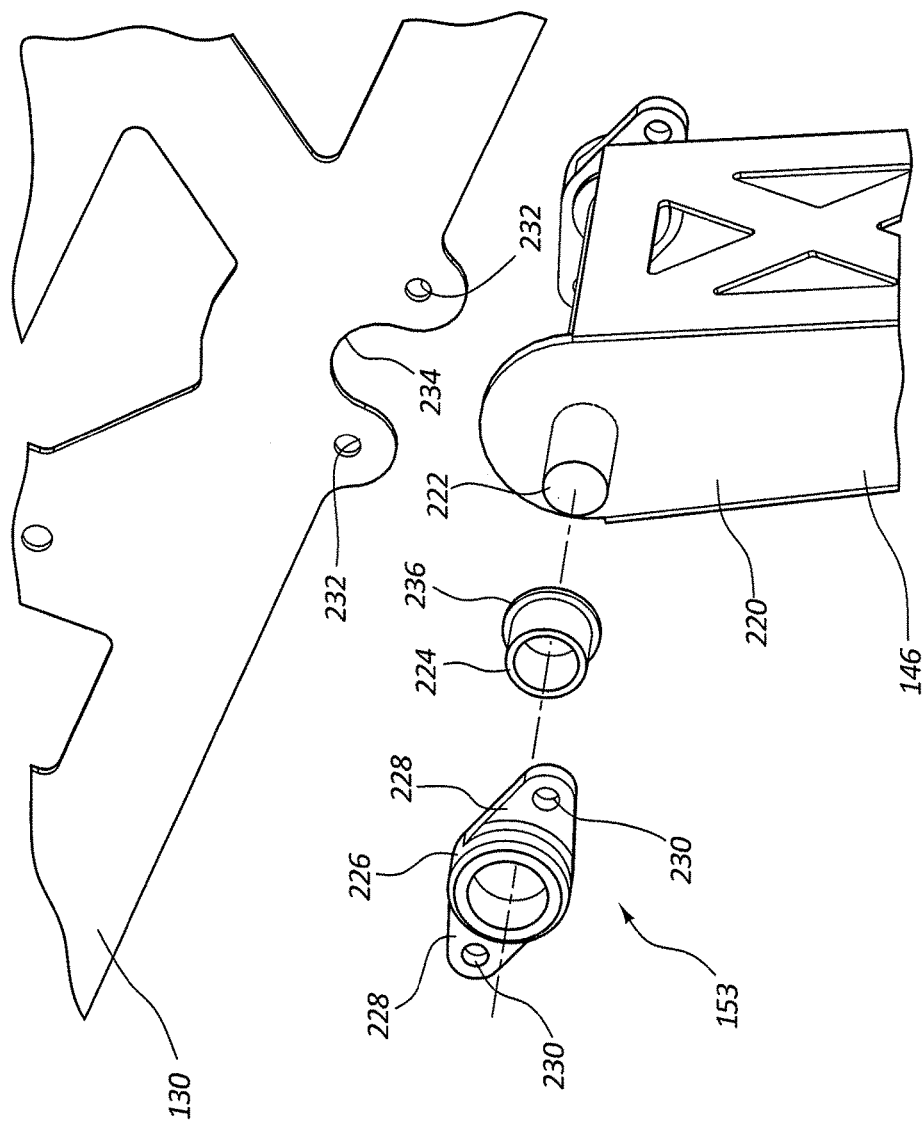

TRACKED VEHICLE SUSPENSION SYSTEMS AND METHODS

RELATED APPLICATION

This is a continuation of U.S. patent application Ser. No. 14/744,986, filed on 19 Jun. 2015, now pending, the disclosure of which is incorporated, in its entirety, by this reference.

TECHNICAL FIELD

The present disclosure generally relates to tracked vehicles such as off-road vehicles and specifically relates to suspension, frame, and hull configurations for such vehicles.

BACKGROUND

Track-based off-road vehicles provide mobility and versatility to outdoor travelers. These vehicles have low ground pressure and high ground contact area, so they may effectively travel over snow, mud, rocks, and other debris with relative ease compared to other wheeled vehicles. Thus, they are prized for their ability to provide access to wilderness areas that are difficult or impossible to reach otherwise.

Some off-road vehicles are used for amphibious expeditions. They may have a hull that is water-tight and boat-like so that when the vehicle drives into deep water, it may float and be propelled across the water's surface before seamlessly exiting the water and transitioning back to land travel. These vehicles typically have four, six, or eight air-filled off-road tires that are used to propel the vehicle while on land.

Previous attempts to combine the advantages of tracked vehicles with these amphibious vehicles have produced poor results. These modified vehicles typically have an endless track wrapped around the pneumatic wheels on each side of the amphibious vehicle. While this may provide some of the advantages of tracked vehicles to the amphibious vehicles, the amphibious vehicles subsequently have many issues. They need constant maintenance due to slippage between the track and wheels, difficulty in keeping proper air pressure and alignment of the pneumatic wheels, and faults in the mechanical drive system that uses clutches, belts, chains, sprockets, transmission, and axles. They also provide a rough ride for the operator due to the wheels being attached to rigid or semi rigid axles extending through the floating hull of the vehicle, and they have poor traction due to insufficient inner support for the track between the pneumatic wheels. They also have challenges in water egression due to the mechanical drive train passing through the hull of the machines. The unibody construction of these modified amphibious vehicles also limits or eliminates the vehicle's ability to adjust its ground clearance or ride height and can mean that the shape and size of the body is not optimized for stability while floating in water. Thus, many inherent issues with their designs make them clumsy to drive and maintain.

There is therefore a need for improvements to tracked vehicles configured for off-road travel.

SUMMARY

One aspect of the present disclosure relates to a tracked vehicle having a pivotable suspension. The vehicle may comprise a vehicle frame and a motor configured to produce power for the vehicle. The vehicle may include a left track assembly and a right track assembly each connected to the frame. Each of the assemblies may comprise a drive wheel configured to be driven by the motor, an endless track configured to be driven by the drive wheel (wherein the endless track has an outer side and an inner side), a bogie positioned on the inner side of the endless track, a support wheel attached to the bogie and configured to roll on the inner side of the endless track, a strut connected to the frame and connected to the bogie (wherein the strut is pivotable relative to the frame), and a shock absorber connected to the frame and connected to the strut. The shock absorber may also be pivotable relative to the frame.

In various embodiments, the strut and shock absorber may be configured to rotate in opposite directions upon application of a force to the bogie. The shock absorber of the left and right track assemblies may comprise a dampening apparatus and a spring. The vehicle may have a ride height defined between a bottom of the frame and a bottom of the left and right track assemblies, with the ride height being adjustable by changing a length of the shock absorbers. The strut and shock absorber may be movable to compliment a lead angle of the endless track. The bogie may comprise a track contact surface configured to slidingly contact the inner side of the endless track, and the inner side of the endless track may comprise a plurality of ridges, wherein the track contact surface contacts the inner side between two of the ridges.

The tracked vehicle may further comprise a track tensioning assembly which includes a tensioning wheel configured to roll on the inner side of the endless track, a beam linked to the tensioning wheel, and a biasing member configured to bias the beam and tensioning wheel toward the inner side of the endless track. The beam may be slidingly connected to the frame of the tracked vehicle. The biasing member may be attached to a movable stop surface on the frame. The movable stop surface may be connected to a threaded rod, with the threaded rod being connected to the frame, wherein rotation of the threaded rod relative to the movable stop surface moves the movable stop surface along the threaded rod. The biasing member may also be positioned within the beam.

In some embodiments a floatable hull is positioned between the left and right track assemblies of the vehicle. The floatable hull may have an upper portion configured to be positioned above a water surface while floating and a lower portion positioned below the water surface while floating, wherein the endless track is positioned relative to the floatable hull with a portion of the endless track above the water surface while the floatable hull is floating.

A front end of the frame may connect the left and right track assemblies, and a rear end of the frame may connect the left and right track assemblies. The struts of the left and right track assemblies may be straight.

In another aspect of the disclosure, a track assembly for an off-road vehicle is set forth. The track assembly may include a base member, a plurality of bogies each having a plurality of support wheels, and a plurality of suspension systems. The suspension systems may each comprise a strut having a top end portion and a bottom end portion, with the top end portion being pivotally connected to the base member and the bottom end portion being connected to one of the bogies. The suspension systems may also include a compressible shock absorber having a top end portion and a bottom end portion, with the top end portion being pivotally connected to the base member and the bottom end portion being connected to the strut. An endless track may extend around at least the plurality of support wheels and the bogies.

In some embodiments, the plurality of bogies contact the endless track. The plurality of bogies may comprise a first material and a second material, with the first material contacting the endless track and the second material forming a core within the first material. The plurality of bogies may be positioned between ridges formed along an inner surface of the endless track. The shock absorbers may be configured to bias the bogies toward the endless track. A tensioning apparatus may also be included which may comprise a tensioning wheel configured to roll in contact with the endless track, a tensioning arm attached to the tensioning wheel and to the base member of the track assembly. The tensioning arm may have a length defined between an attachment point at the tensioning wheel and an engagement point at the base member, and the length of the tensioning arm may be variable in response to a change in pressure against the tensioning wheel by the endless track.

The tensioning apparatus may comprise a biasing member configured to apply a biasing force to the tensioning wheel toward the endless track. That biasing force may be adjustable.

In yet another aspect of the disclosure, a track assembly for an off-road vehicle is provided, wherein the track assembly comprises a base member, a plurality of support wheels connected to the base member, an endless track in contact with the plurality of support wheels, a tensioning wheel configured to roll in contact with the endless track, and a tensioning arm attached to the tensioning wheel and to the base member. The tensioning arm may have a length defined between an attachment point at the tensioning wheel and an engagement point at the base member, and the length of the tensioning arm between the attachment point and the engagement point may be variable in response to a change in pressure against the tensioning wheel by the endless track.

A biasing member may also be included that is configured to apply a biasing force to the tensioning wheel toward the endless track. The biasing force may be adjustable. The biasing member may have a first end portion and a second end portion, with the first end portion being proximate the tensioning wheel relative to the second end portion and the second end portion being connected to a support surface proximate the base member relative to the first end portion. The support surface may be movable relative to the tensioning wheel.

In some arrangements the tensioning wheel comprises a first tensioning wheel and a second tensioning wheel, with the first tensioning wheel being positioned on a first side of the tensioning arm and the second tensioning wheel being positioned on a second side of the tensioning arm, the second side being opposite the first side. The tensioning wheel may comprise a circumferential groove and the endless track may comprise at least one ridge, with the at least one ridge being positioned within the circumferential groove.

The above summary of the present invention is not intended to describe each embodiment or every implementation of the present invention. The Figures and the detailed description that follow more particularly exemplify one or more preferred embodiments.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

FIG. 14 is an exploded view of a pivotable interface between a strut and a base member of the vehicle of FIG. 1.

Figure 1:
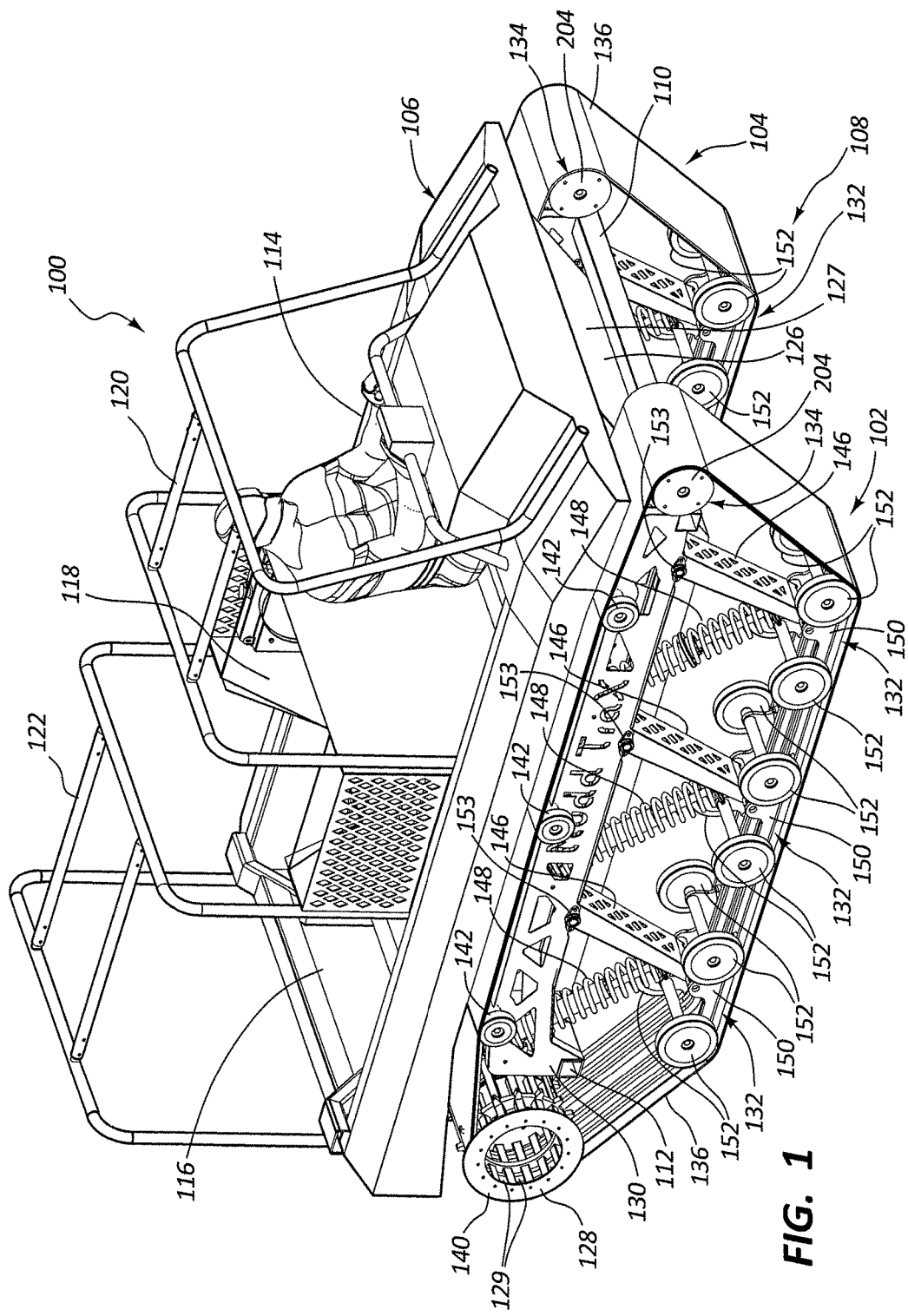
FIG. 1 is a perspective front view of a vehicle according to the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure generally relates to a compact, lightweight, low ground pressure vehicle that is capable of traversing dirt, mud, snow, and water by use of a tracked suspension system and floatable hull. It may provide superior comfort for a rider or operator and access remote locations that are inaccessible to other off-road vehicles. The vehicle may be modular in nature to allow a variety of seating and cargo-carrying configurations, safety features, towing or plowing attachments, and other features.

While previous tracked vehicles have implemented tracks around pneumatic wheels, the present disclosure relates to a tracked vehicle originally designed with tracked travel in mind. In one embodiment, the present tracked vehicle may have a pivotable suspension. The vehicle may include a frame and a motor configured to produce power for the vehicle. Left and right track assemblies may be used to propel the vehicle across land or water. Each of the track assemblies may include a drive wheel configured to be driven by the motor, an endless track configured to be driven by the drive wheel, wherein the track has an inner side and an outer side, and a bogie positioned on the inner side of the track. One or more support wheels may be attached to the bogie and configured to roll on the inner side of the track. A strut may be connected to the frame and the bogie and a shock absorber may be connected to the frame and to the strut. The strut and shock absorber may each be pivotable relative to the frame.

The strut and shock absorbers may allow the bogie to move relative to the frame and thereby provide shock and bump absorption as the vehicle traverses rough terrain. Also, some embodiments may have a plurality of bogies in each track assembly, wherein each bogie is independently suspended relative to the frame using a strut and a shock absorber. Thus, each of the bogies may be pivotable relative to the struts and may have a plurality of support wheels. This means that the track surface area that contacts the ground may be maximized by each of the bogies independently conforming to the ground shape by pivoting or having the struts move toward and away from the frame. The high contact area of the tracks reduces ground pressure, so travel over mud and snow is faster and more reliable. The tracks also stay in place on the wheels and bogies better than tracks configured to extend around pneumatic wheels, so required maintenance is reduced and track reliability is enhanced.

An adjustable track tensioning assembly may also be included. The track tensioning assembly may include a threaded-rod track tensioning system that has a captured spring or other biasing member. As the independent suspensions of the track assembly go over obstacles and flex toward the chassis and frame of the vehicle, the tensioning system may provide tension to the track to keep the track belt secured to the vehicle. The rod threads may also be turned to set optimal track tension or to release tension on the track (e.g., for installing or removing the track).

In some embodiments, the bogies include track guide surfaces that extend into contact with an inner surface of the track. These surfaces may be covered with a slidable material such as, for example, an ultra high molecular weight (UHMW) plastic to reduce friction in contact with the track. These surfaces may be seated between ridges on the inner surface of the track to help keep the track aligned relative to the bogies and wheels. The slidable material covering the bogie may also be replaceable upon wearing out.

The frame of the vehicle may be modular, wherein the track assemblies may be linked to each other independent of a chassis or floatable hull. Thus, multiple different modular hulls may be attached to the frame. A hull may be designed to drop into the exoskeleton of the frame so that the number of penetrated holes (e.g., that would be used for wheel axles in traditional hulls) may be limited. Each hull may have different seating or cargo carrying ability. A rollover protection cab may also be attached to the modular frame and/or hull.

The hull may also contain a motor or engine system (e.g., a gas or diesel engine or electric motor) that is remotely linked to the drive wheels of the track assemblies, such as, for example, by use of a hydraulic pump and power unit linking the drive wheels and the motor. In this way, the track assemblies may not be mechanically attached to the motor by chains, gears, and other mechanical devices, so movement of the track assemblies relative to the motor may not prevent driving operation of the track via the drive wheels. This may also improve the modularity of the system since the motor may be exchanged for another motor or may be relatively easily disconnected and reattached when a hull is swapped out for a different shape or design.

A chassis or hull may be floatable and may have shape characteristics that support boat-like travel over water. In such embodiments, the floatable hull may be positioned relative to the frame so that the top portions of the track assemblies are above the water surface when the vehicle is floating. In this way, the track assemblies may be used for forward and backward propulsion on the water surface. In other embodiments, the frame or hull may be configured to hold an independent propulsion system (e.g., a propeller or jet).

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

Figure 2:
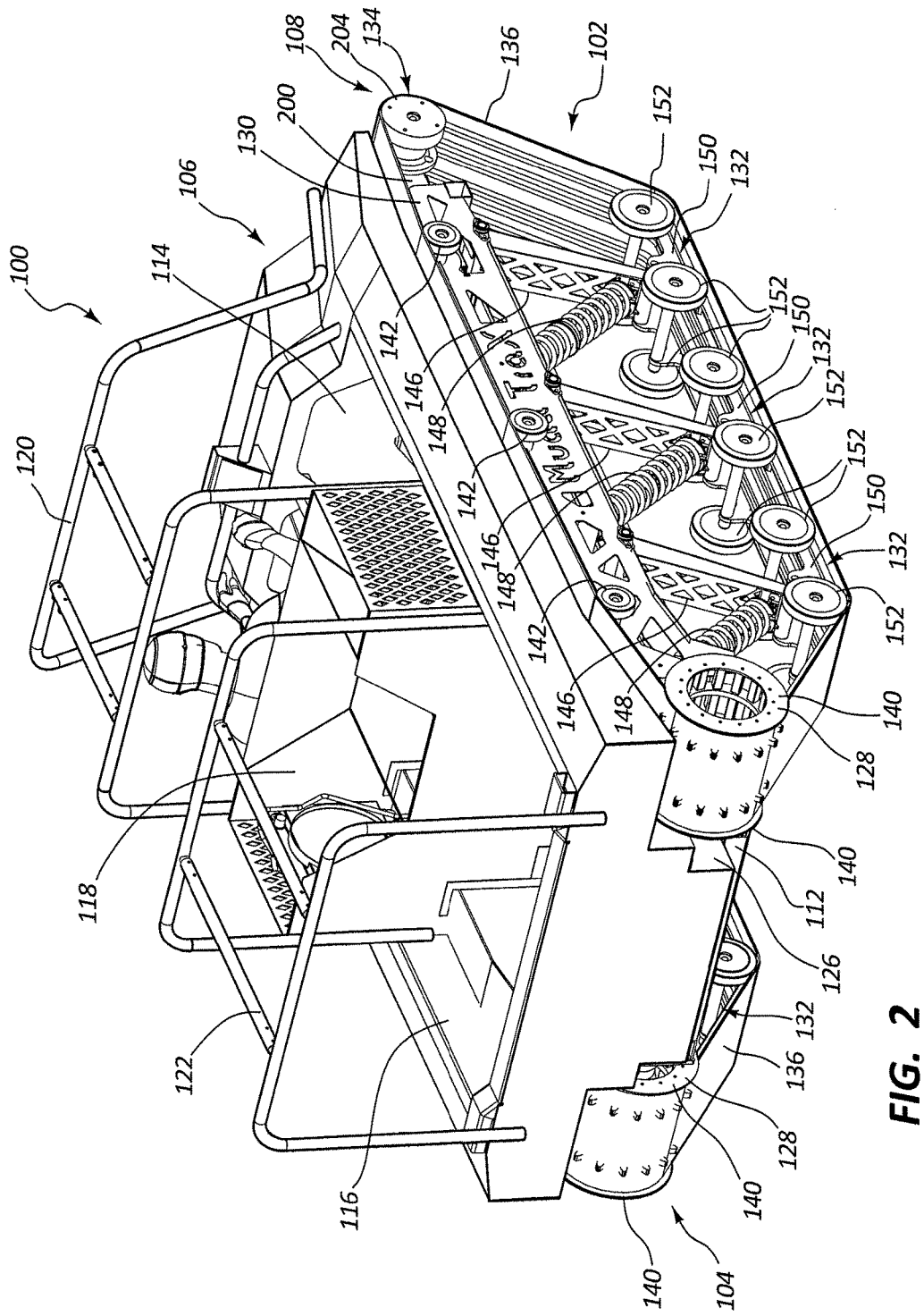
FIG. 2 is a rear perspective view of the vehicle of FIG. 1.
Figure 3:
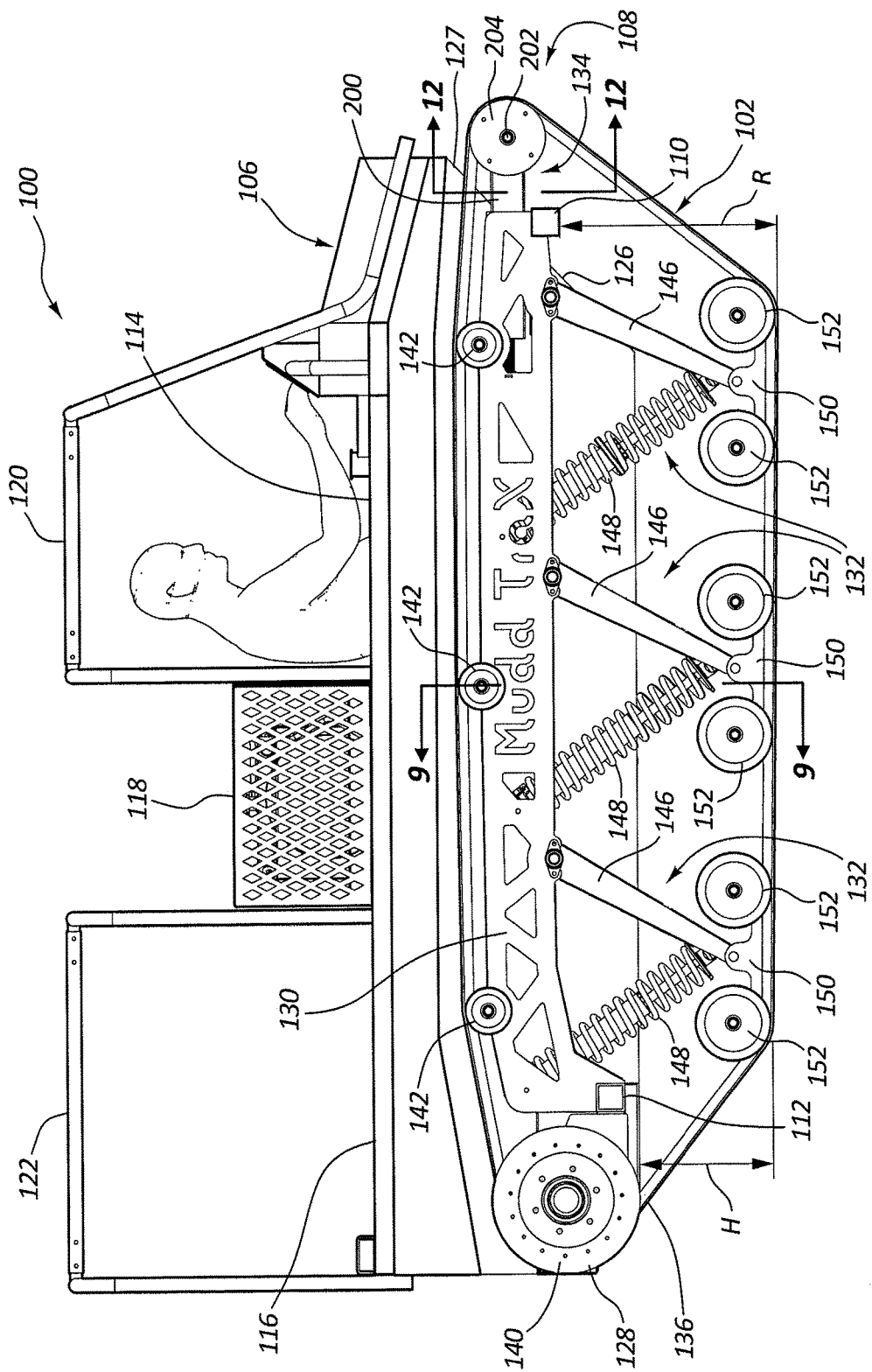
FIG. 3 is a right side view of the vehicle of FIG. 1.
Figure 4:
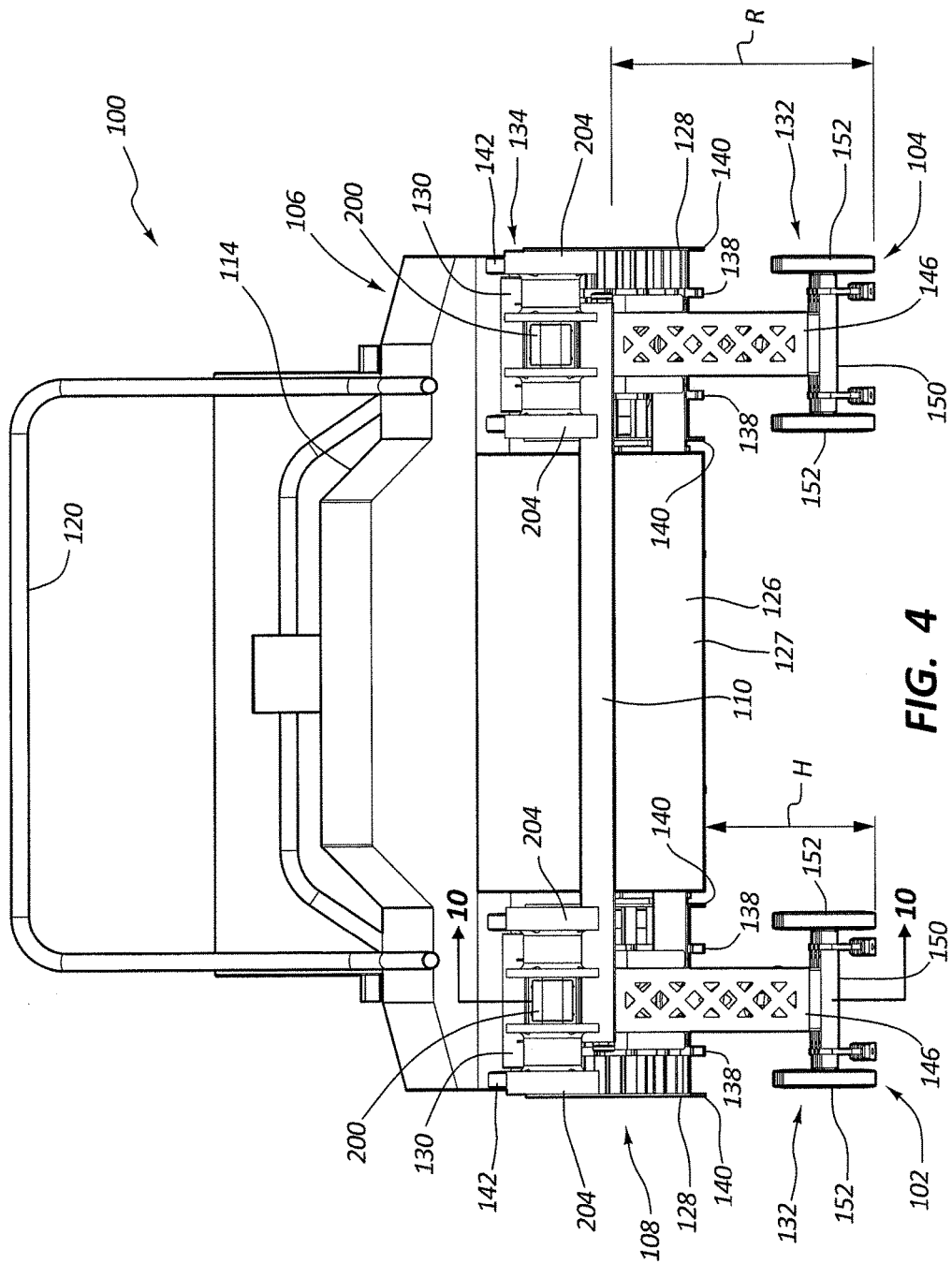
FIG. 4 is a front view of the vehicle of FIG. 1 with the endless tracks removed.

Additional features, configurations, and processes will be disclosed or apparent by reference to the appended figures. FIGS. 1-3 illustrate various views of an example off-road vehicle 100 of the present disclosure. FIGS. 1 and 2 are perspective views and FIG. 3 is a side view. FIG. 4 is a front view of the vehicle 100 with track belts removed from the track assemblies.

The vehicle 100 may comprise two track assemblies 102, 104 that are positioned on opposite sides of a body or hull 106 with a right track assembly 102 on the right side of the hull 106 and a left track assembly 104 on the left side of the hull 104. The track assemblies 102, 104 may be part of a frame 108 in which the hull 106 is positioned. The frame 108 may comprise the track assemblies 102, 104, a front frame member 110, and a rear frame member 112. The frame 108 and hull 106 may be modularly designed so that the hull 106 may be removed from the frame 108 and replaced with another hull.

The hull 106 may comprise a seating area 114, a cargo area 116, and a utility area 118. The hull 106 may be formed of a lightweight material such as, for example, aluminum or molded plastic. The seating area 114 may be configured to seat passengers and operators of the vehicle 100 with side-by-side positioning. Thus, the seating area 114 may comprise seats and the driving controls for the operator to drive the vehicle 100. In some arrangements the driving controls may comprise at least one of a hydraulic joystick, manual joystick, electric joystick or a "T" handled steering bar. The seating area 114 may be protected by a rollover cage 120 or similar protective structure. In some embodiments, the cage 120 may be removable or may be omitted.

The cargo area 116 of the hull 106 may comprise space in which cargo may be carried. The cargo area 116 may also be protected by a rollover cage 122. In some configurations, the cargo area 116 may be configured instead as a second seating area to hold more passengers. For example, an alternative modular hull 106 may be installed in the frame 108 that has a seating area where the cargo area 116 is located in the present embodiment.

The utility area 118 of the hull 106 may contain the motor or engine of the vehicle 100 along with other associated vehicle components such as, for example, a battery, an alternator, a fuel tank, and/or a hydrostatic pump for operating the track assemblies 102, 104. Those having ordinary skill in the art will perceive other types of equipment that would be needed in such a utility area 118. The utility area 118 may be at least partially defined under the seats in the seating area 114 in order to maximize the efficient use of space in the hull 106. The relative position of the utility area 118 in each hull 106 may differ.

The hull may have an underside surface 126 configured to float. The underside surface 126 may therefore be watertight as well, and may keep the interior of the hull 106 from flooding when the vehicle 100 enters a body of water. The front end 127 of the underside surface 126 may be angled in order to improve the hydrodynamic ability of the vehicle 100 to travel through water. The front and rear frame members 110, 112 may be external to the underside surface 126 in order to limit the number of openings through the underside surface 126 that may leak or may be points of structural weakness for the hull 106. The frame members 110, 112 may also be external to the underside surface 126 to make the hull 106 easier to remove and exchange for another modular hull. In other words, the front and rear frame members 110, 112 of the frame 108 may not extend through or penetrate the hull 106. The hull 106 may be attached to the frame members 110, 112 or may be attached to other portions of the frame, such as to the rigid structures (e.g., base members 130) in the track assemblies 102, 104.

Figure 13:
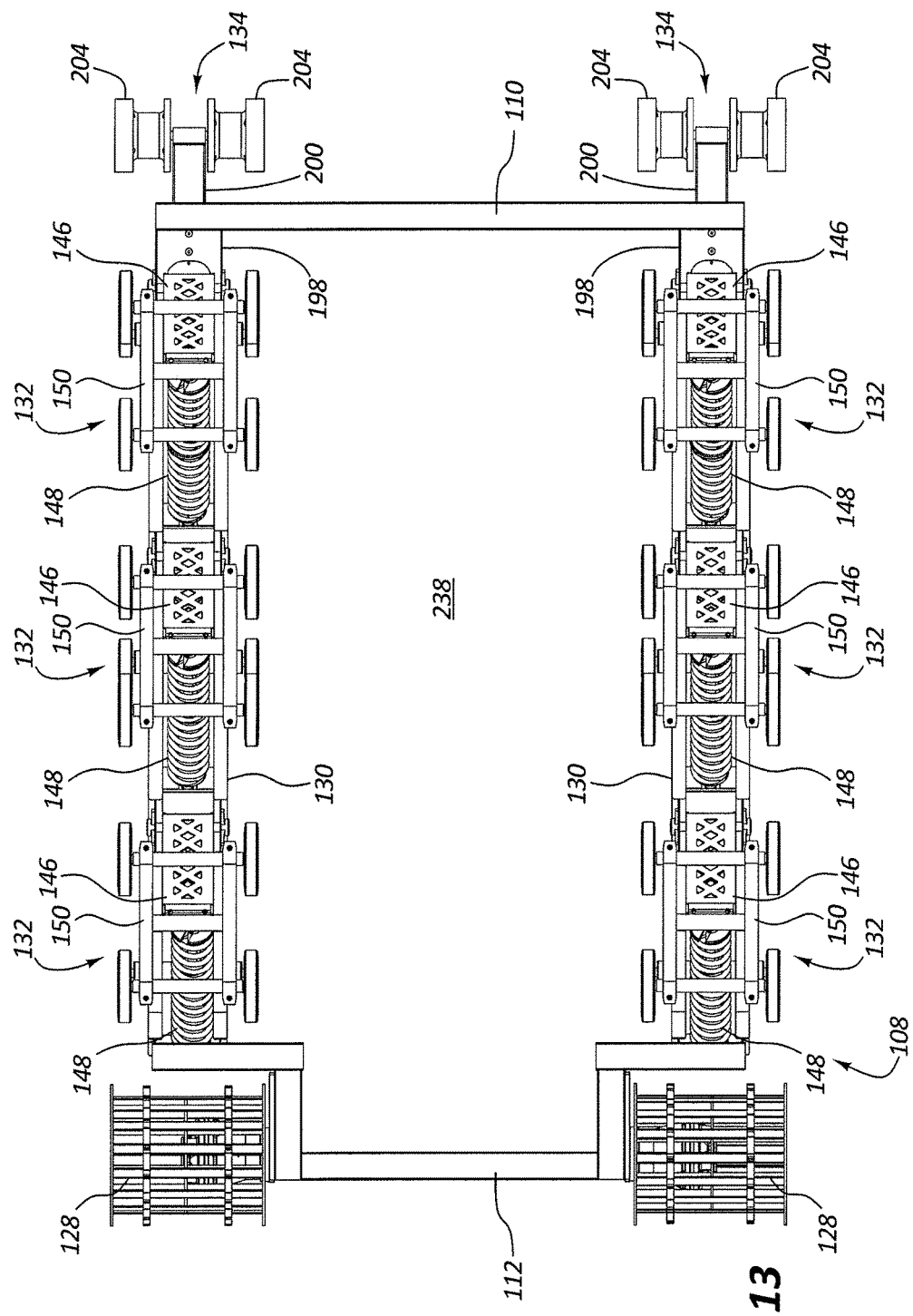
FIG. 13 is a bottom view of the frame of the vehicle of FIG. 1 with the endless tracks and hull removed.

In some configurations one or more frame members 110, 112 may include a receiver tube to allow for attachments to the vehicle 100 such as, for example, a winch or a trailer hitch. Other attachment points on the frame 110, 112 may also be used for other purposes such as, for example, for the attachment of bumpers, steps, light bars, additional storage racks and user-specific equipment. FIG. 13 shows a bottom view of the frame 108 isolated from the hull 106 and from the endless tracks 136 of the track assemblies 102, 104. The front and rear frame members 110, 112 may be seen connecting the front and rear ends of the track assemblies 102, 104. The hull 106 may be attached therebetween in the opening 238, as shown in FIGS. 1-4.

Thus, one aspect of the present disclosure relates to a method of constructing a vehicle, comprising providing a frame having a plurality of track assemblies and frame members connecting the track assemblies, then attaching a floatable hull between the track assemblies and the frame members. The method may further include removing the hull and replacing the hull with a second hull between the track assemblies and frame members. Replacement of the hull may comprise increasing the number of available seats or cargo areas in the vehicle. Replacement of the hull may also comprise disconnecting a hydraulic system in the first hull from the track assemblies and connecting a hydraulic system to the track assemblies when the second hull is attached. In these embodiments, the hydraulic system may be positioned at different positions relative to the frame in each of the first and second hulls. In some embodiments, the method may also include positioning the hull relative to the frame with the top of the track assemblies lying above a waterline or float line on the hull and/or replacement hull when the vehicle is floating.

Figure 5:
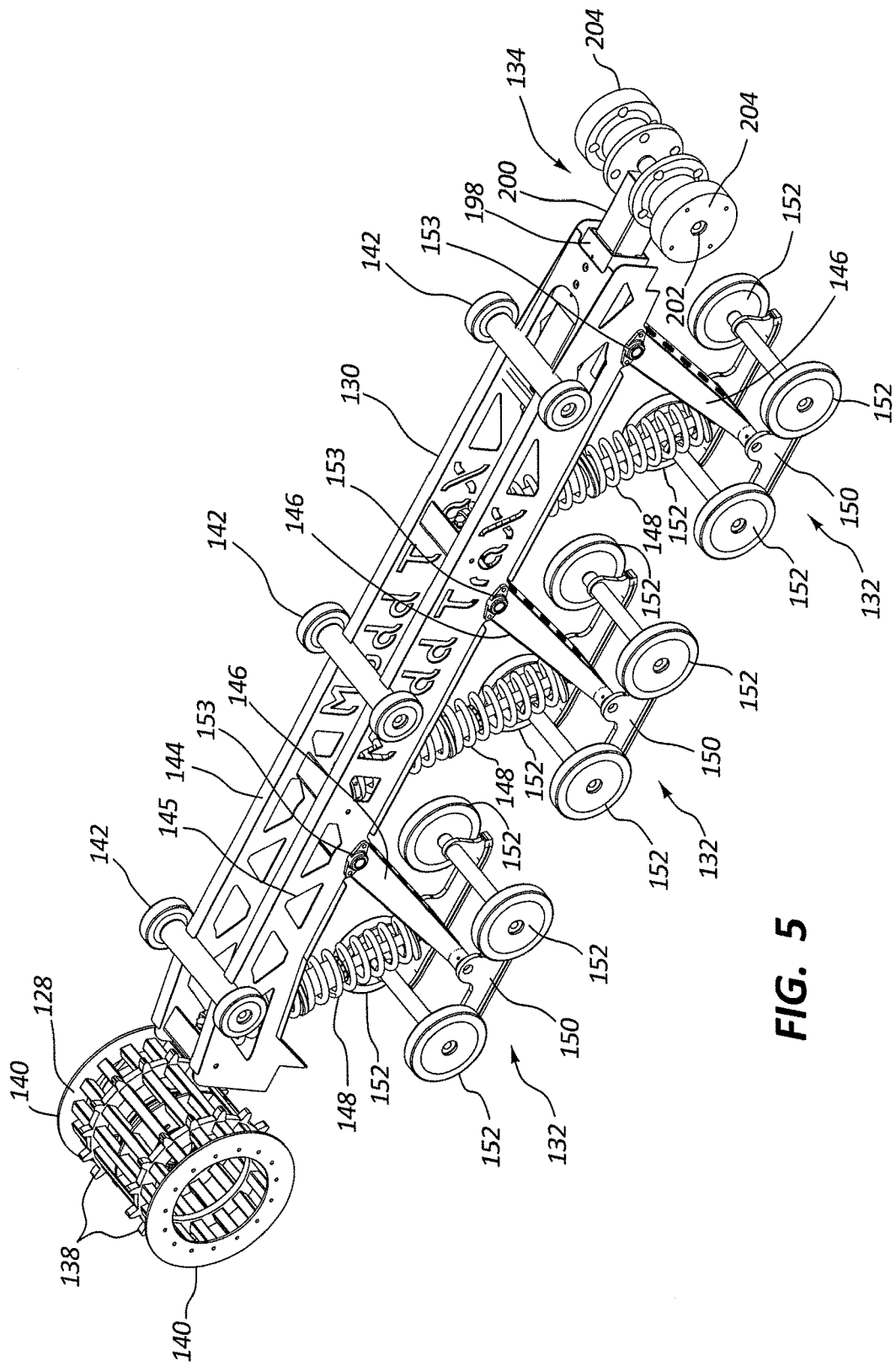
FIG. 5 is a perspective view of a track assembly with the endless track removed.

The track assemblies 102, 104 may extend along the length of the hull 106 and may extend downward from the hull 106 to provide a ride height or ground clearance height H. See FIGS. 3-4. The clearance height H may be adjustable by adjustment of the height of the track assemblies 102, 104 relative to the hull 106. One way that the clearance height H may be adjusted is by changing the length of the shock absorbers 148 or the angle of the struts 146 relative to the base member 130 of the track assemblies 102, 104. See FIGS. 5 and 10 and their related descriptions below.

The track assemblies 102, 104 may each comprise a drive wheel 128, a base member 130, a plurality of bogie suspension assemblies 132, a tensioning assembly 134, and an endless belt or track 136. See also FIG. 5, which shows a perspective view of the right track assembly 102 with the track 136 removed.

The drive wheel 128 may be connected to the motor or engine in the hull 106 or within the drive wheel 128. For example, the drive wheel 128 may be hydraulically driven by a hydraulic motor within the drive wheel 128 that receives hydraulic oil from a pump powered by the motor or engine in the utility area 118.

Each drive wheel 128 may comprise outer teeth 138 used to grip and pull the track 136. See FIG. 5. Outer rims 140 of the drive wheels 128 may keep the track 136 from slipping from the drive wheels 128. The drive wheels 128 may have a plurality of slits 129 or other openings through which debris can fall through when the vehicle gets dirty. See FIG. 1.

The base member 130 may be an elongated structural support for the track assembly 102. The base member 130 may be positioned above the bogie suspension assemblies 132 and may be pivotally connected to the bogie suspension assemblies 132. The base member 130 may also be attached to the front and rear frame members 110, 112 and to the hull 106. The base member 130 may be connected to axles for a plurality of top roller wheels 142 that are positioned spaced across the top of the base member 130. The top roller wheels 142 may help ensure smooth movement of the track 136 as it winds around the track assembly 102. A front end of the base member 130 may receive the rear end of the tensioning assembly 134. In some embodiments, each base member 130 may comprise two sides, such as a left side 144 and a right side 145 that are connected to each other with a void therebetween. See FIG. 5. The hull 106 may be attached to one or both sides 144, 145. Thus, the base member 130 may provide structural stability without adding an undue amount of weight.

The bogie suspension assemblies 132 may be pivotally connected to the base member 130. Each bogie suspension assembly 132 may comprise a strut 146, a shock absorber 148, a bogie 150, and one or more support wheels 152. There may be multiple bogie suspension assemblies 132 connected to each base member 130 that allow each bogie 150 to move independent of the other bogies 150. Thus, each of the bogies 150 is independently suspended from the base member 130 within the track assembly 102. The bogie suspension assemblies 132 may each have about 10 inches of vertical travel for each bogie 150 relative to the base member 130. The clearance height H of the vehicle 100 may be adjusted by adjusting the vertical position of the bogies 150 relative to the frame 108 (e.g., relative to the frame members 110, 112 or relative to the base members 130). Alternatively, a ride height R (see FIGS. 3-4) may be defined as the distance between a bottom of a frame member (e.g., 110) and the bottom of a track assembly 102, 104. These heights H, R may be changed by changing the lengths of the shock absorbers 148 of the bogie suspension assemblies 132 and by rotating the struts 146 relative to the base member 130.

When the vehicle 100 traverses rough and uneven terrain, each of the bogies 150 may individually move upward toward the base member 130 upon encountering an obstacle (e.g., a log or rock) while the other bogies 150 not in contact with the obstacle remain in their normal extended positions. Thus, ground contact and the surface area of the track 136 in contact with the ground may be maintained more effectively than a four wheeled vehicle since multiple bogies 150 may pressure the track 136 into contact with the ground while other bogies 150 are pressured away from the ground by the obstacle. In addition, each bogie 150 may be pivotally connected to respective struts 146, so the angle of each bogie 150 relative to the struts 146 may be variable in conformance with the shape of the obstacle being encountered by the track 136 and support for the track 136 may thereby be maintained. This may allow the suspension to have an additional four inches of travel as well as a more comfortable ride. For example, the axle of the front support wheels 152 of a bogie 150 may move upward before the axle of the rear support wheels 152 of a bogie 150 moves due to the pivoted connection between a strut 146 and the bogie 150. Additionally, the lead angle A (see FIG. 10) of the track 136 may change as the front bogie 150 is moved up and down with the strut 146 and shock absorber 148. Thus, movement of the bogie 150 may compliment the lead angle A of the endless track 136.

In some embodiments, the shock absorbers 148 of the independent bogie suspension assemblies 132 may be actuated to control the position of the center of gravity of the vehicle, the angle of the hull 106 relative to the ground, and/or the clearance or ride heights H, R. For example, when the vehicle is moving up a steep incline, the front-most bogie suspension assembly 132 may be moved closer to the base member 130 and the rear-most bogie suspension assembly 132 may be moved away from the base member 130 so that the hull 106 does not tilt to an angle parallel with the incline, which may lead to a backward rollover. On a decline, the front-most suspension assembly 132 may be lengthened while the rear-most suspension assembly 132 may be shortened to avoid forward rollover. Similarly, when the vehicle 100 undergoes high acceleration, the bogie suspension assemblies 132 may be actuated to keep the vehicle 100 from tilting too much or too quickly. The actuation of the height of each bogie suspension assembly 132 may be controlled manually by the vehicle operator or may be controlled by an automatic system, such as, for example, a system based on an accelerometer or tilt sensor.

The struts 146 may be rigid members extending between the bogies 150 and the base member 130. Each strut 146 may be straight between its connection points at a bogie 150 and the base member 130. The struts 146 may be pivotally connected to the base member 130, and, in some embodiments, may also be pivotally connected to the bogie 150. The strut 146 may be connected to hinges 153 at the base member 130. See FIG. 5; see also FIG. 14 and related description below. The strut 146 may be connected to a central axle that extends through central openings 154 of the bogie 150. See FIG. 6. Thus, the pivoted position of the strut 146 relative to the base member 130 may determine the distance between the base member 130 and the bogie 150. As the strut 146 rotates toward the base member 130, the bogie 150 is lifted upward, and as the strut 146 rotates in the opposite direction, the bogie 150 moves downward relative to the base member 130.

The shock absorbers 148 may be connected to the base member 130 and to the struts 146. In some embodiments, shock absorbers 148 may be connected to the bogies 150 instead of the struts 146. The connection between the shock absorbers 148 and the base member 130 may be pivotable, and the connection between the shock absorbers 148 and the struts 146 or bogies 150 may or may not be pivotable. Thus, each shock absorber 148 may move in response to movement of the strut 146. When the strut 146 moves toward the base member 130, the shock absorber 148 may also move toward the base member 130, and vice versa. Their relative movement may also be described as the strut 146 rotating in one direction (e.g., clockwise in FIG. 3 around their upper pivot points) and the shock absorber 148 moving in the opposite direction (e.g., counterclockwise in FIG. 3 around their respective upper pivot points).

Figure 9:
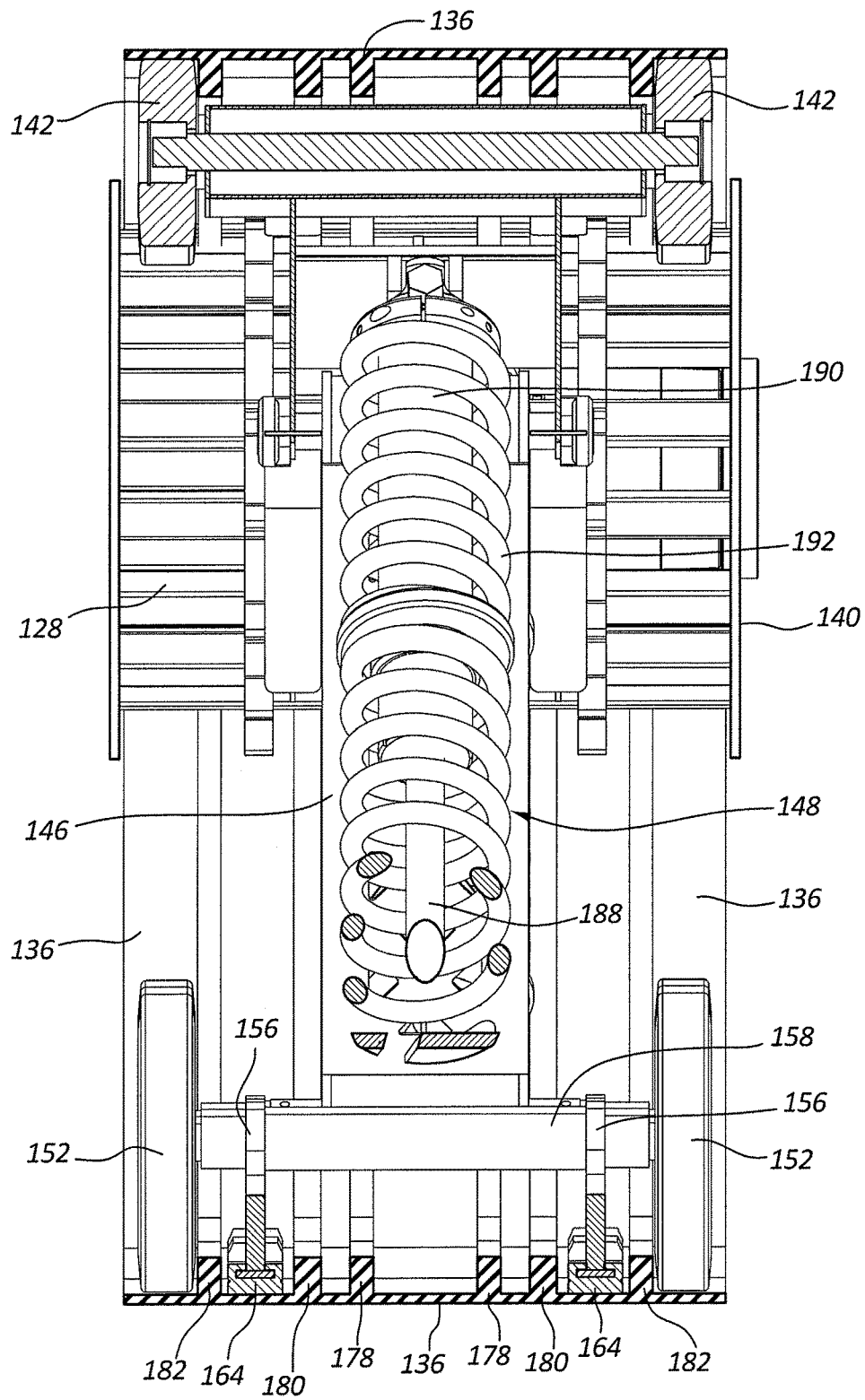
FIG. 9 is a front section view of the track assembly taken through section lines 9-9 in FIG. 3.
Figure 10:
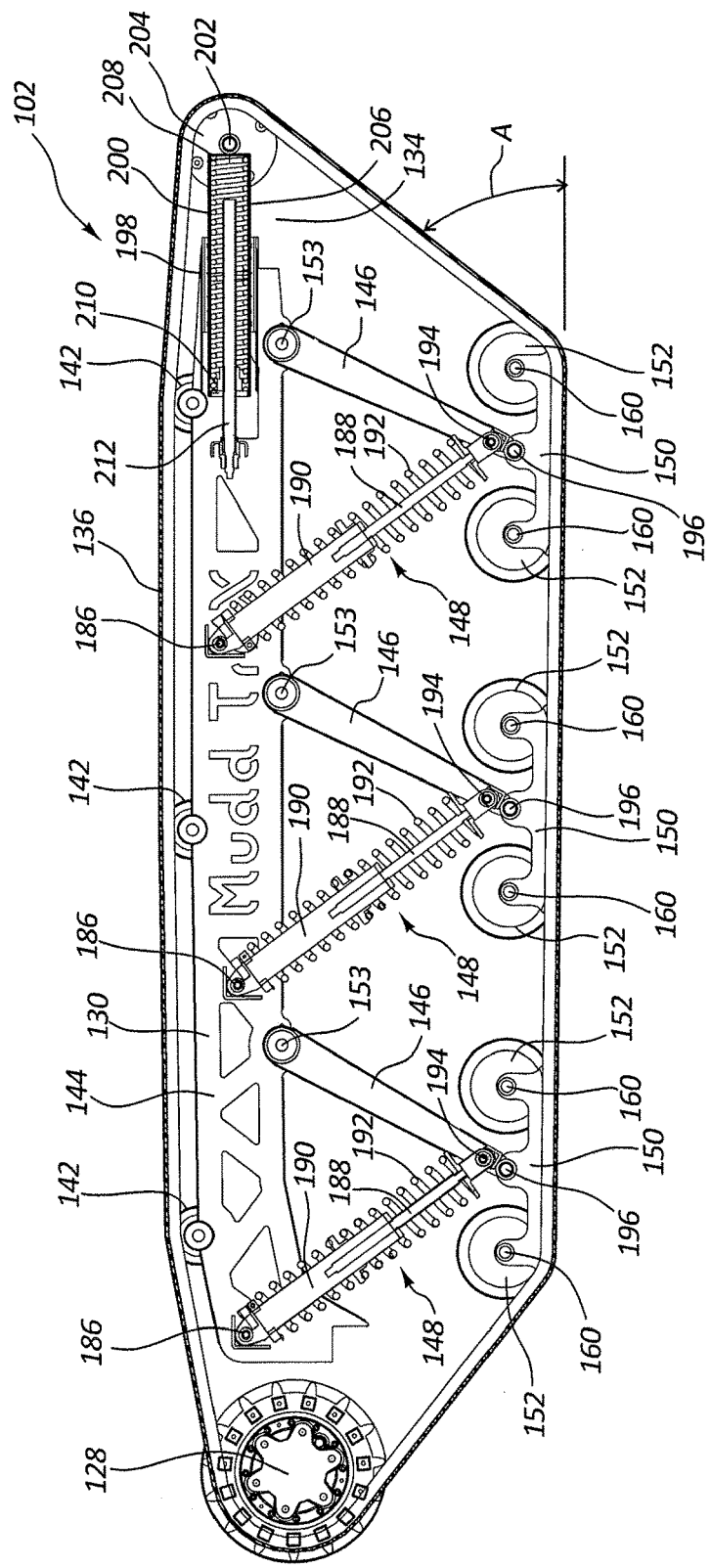
FIG. 10 is a section view of a track assembly of the vehicle of FIG. 1.

The shock absorbers 148 may change in length. For example, the shock absorbers 148 may comprise pneumatic or hydraulic pistons and cylinders configured to lengthen or shorten by telescopic movement. These pistons and cylinders may dampen the movement of the struts 146 and thus may be referred to as dampening members. The shock absorbers 148 may also include coil springs that bias the struts 146 away from the base member 130. FIGS. 9 and 10, described in further detail below, show the components of the shock absorbers 148 in greater detail.

Figure 6:
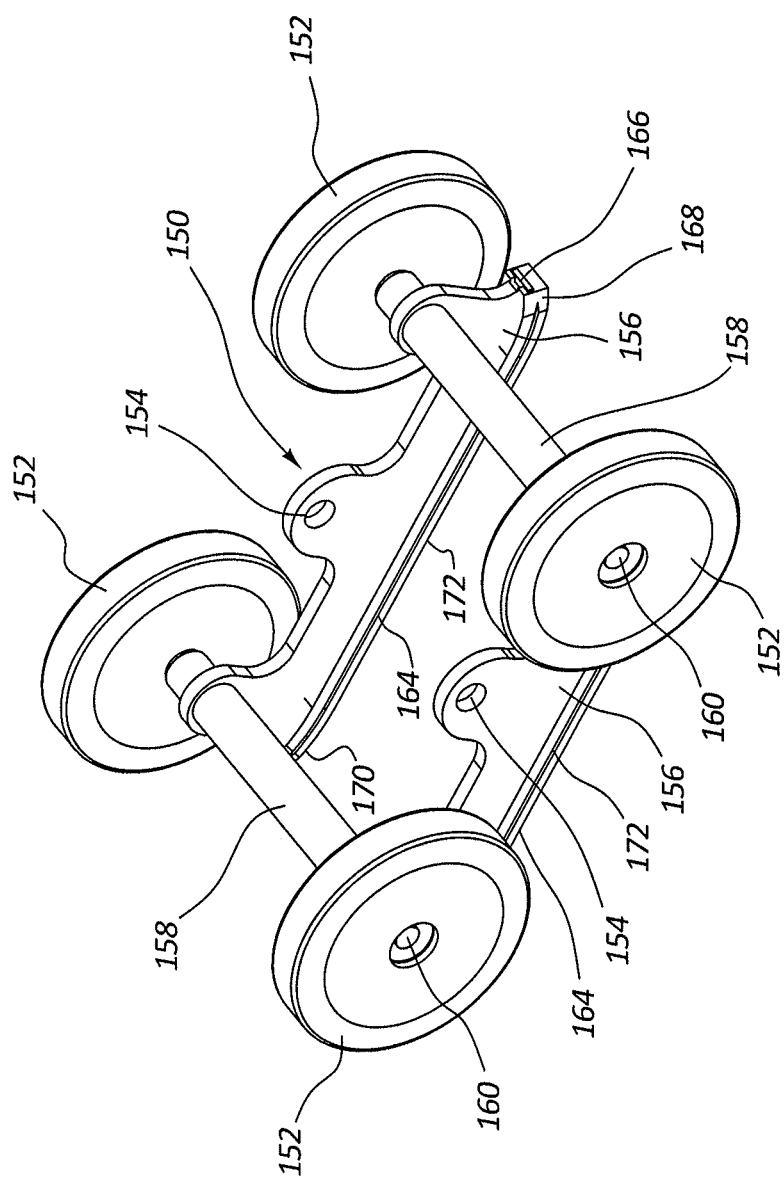
FIG. 6 is a perspective view of a bogie of a vehicle according to the present disclosure.
Figure 7:
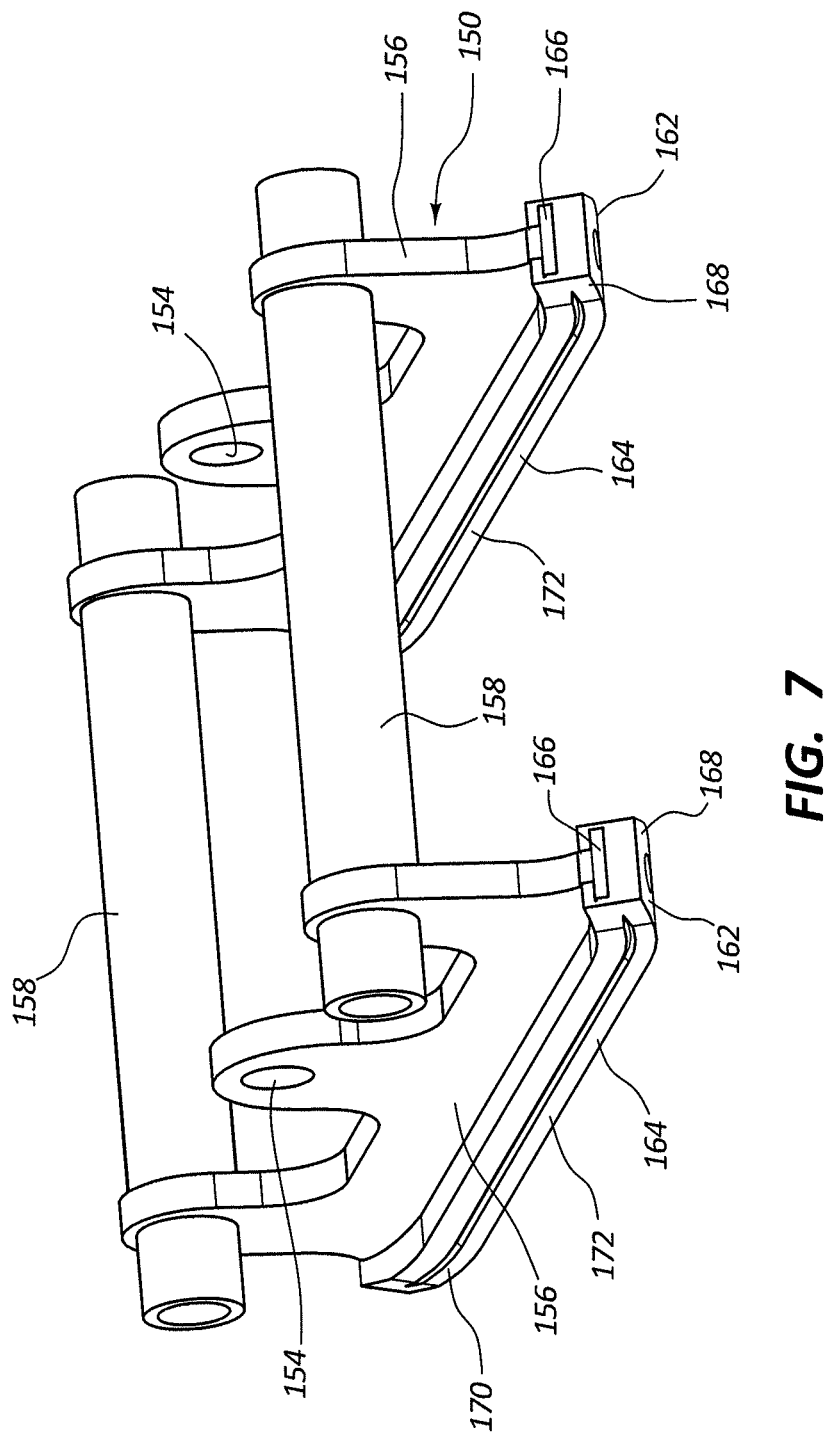
FIG. 7 is a perspective view of the bogie of FIG. 6 with the wheels removed.

Referring now to FIGS. 6-7, a bogie 150 is shown isolated from a bogie suspension assembly 132. The bogie 150 includes two side runners 156 connected by two axle carriers 158. These axle carriers 158 may provide spaced apart axes for the axles of the support wheels 152. The axle carriers 158 may receive axles 160 for the support wheels 152. FIG. 7 shows the bogie 150 isolated from the axles 160 and support wheels 152. The bogies 150 may pivot around the central openings of the axle carriers 158 that are linked to the struts 146 while the bogies 150 and support wheels 152 are in contact with the track 136.

The side runners 156 may comprise track contact surfaces 162. See FIG. 7. The track contact surfaces 162 may slide along the inner surface of the track 136 while the support wheels 152 roll on the track 136. The track contact surfaces 162 may therefore be formed of a resilient and durable yet low-friction material, such as, for example, a UHMW polymer (e.g., UHMW polyethylene). In some embodiments, the contact surfaces 162 may be part of track sleds 164 made to attach to the bottom of the side runners 156. The track sleds 164 may have cores 166 made of a more rigid and tough material than the track sleds 164, such as a metal core that is molded or attached to the side runners 156. The cores 166 may extend through the length of the track sleds 164 or along a portion of the track sleds 164. In some embodiments, the track sleds 164 may be configured to be removable from the cores 166, such as in the case of damage or excessive wear to the track sleds 164.

The track sleds 164 may also have front ends 168 and back ends 170 with curved profiles that are positioned at the ends of an elongated, straight center section 172. The curved ends 168, 170 may help facilitate rotation of the bogie 150 when an obstacle is encountered by the support wheels 152 via the track 136. The curved ends 168, 170 may also help limit blockages or potential snags as the track 136 moves relative to the bogies 150.

Figure 8:
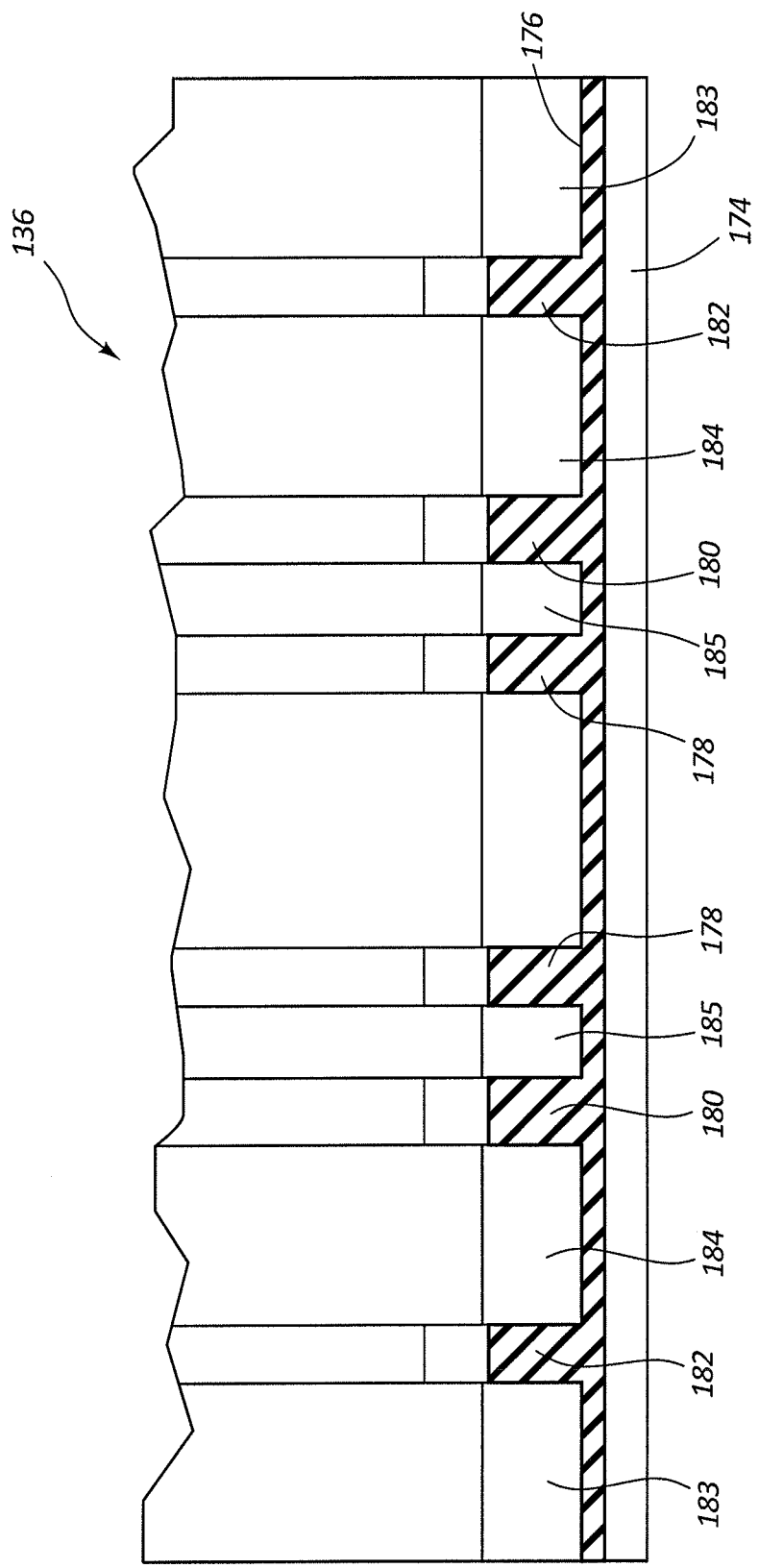
FIG. 8 is a section view of the endless track of the vehicle of FIG. 1.

FIGS. 8-9 show a section view of a portion of the track 136. FIG. 8 shows the track 136 isolated and in detail, and FIG. 9 is a section view of a track assembly 102 of the vehicle 100 taken through section lines 9-9 in FIG. 3. The track 136 may include an outer surface 174 and an inner surface 176. The outer surface 174 may be textured and/or have protrusions and other surface features (not shown) that improve traction. The inner surface 176 may comprise a plurality of ridges 178, 180, 182 forming a plurality of grooves therebetween. The ridges 178, 180, 182 may help keep the track 136 aligned and retained on the track assembly 102, 104. For example, as shown in FIG. 9, the support wheels 152 may be configured to roll on the periphery 183 of the inner surface 176 external to the outermost ridges 182. The track sleds 164 of the bogies 150 may slide within the groove 184 formed by the middle ridges 180 and the outermost ridges 182. Wheels of the tensioning assembly 134 may contact the periphery 183 of the inner surface 176 and may fit in the grooves 185 between the innermost ridges 178 and the middle ridges 180. See also FIG. 12. The outer teeth 138 of the drive wheels 128 may also engage the track 136, such as, for example, within grooves 184. The track 136 may have apertures or detents (not shown) to accommodate and receive the outer teeth 138. In some embodiments, apertures may allow debris to fall out of the track 136 as the vehicle 100 is in motion. The apertures or detents may also comprise reinforcing inserts such as metal brackets that fit around the periphery of the apertures or detents to prevent wear, tearing, and stretching of the track 136. In some embodiments, the ridges 178, 180, 182 may be embodied as a plurality of protrusions or bumps in the inner surface of the track 136. Protrusions or bumps may be spaced apart similar to apertures in the track 136.

Figure 11:
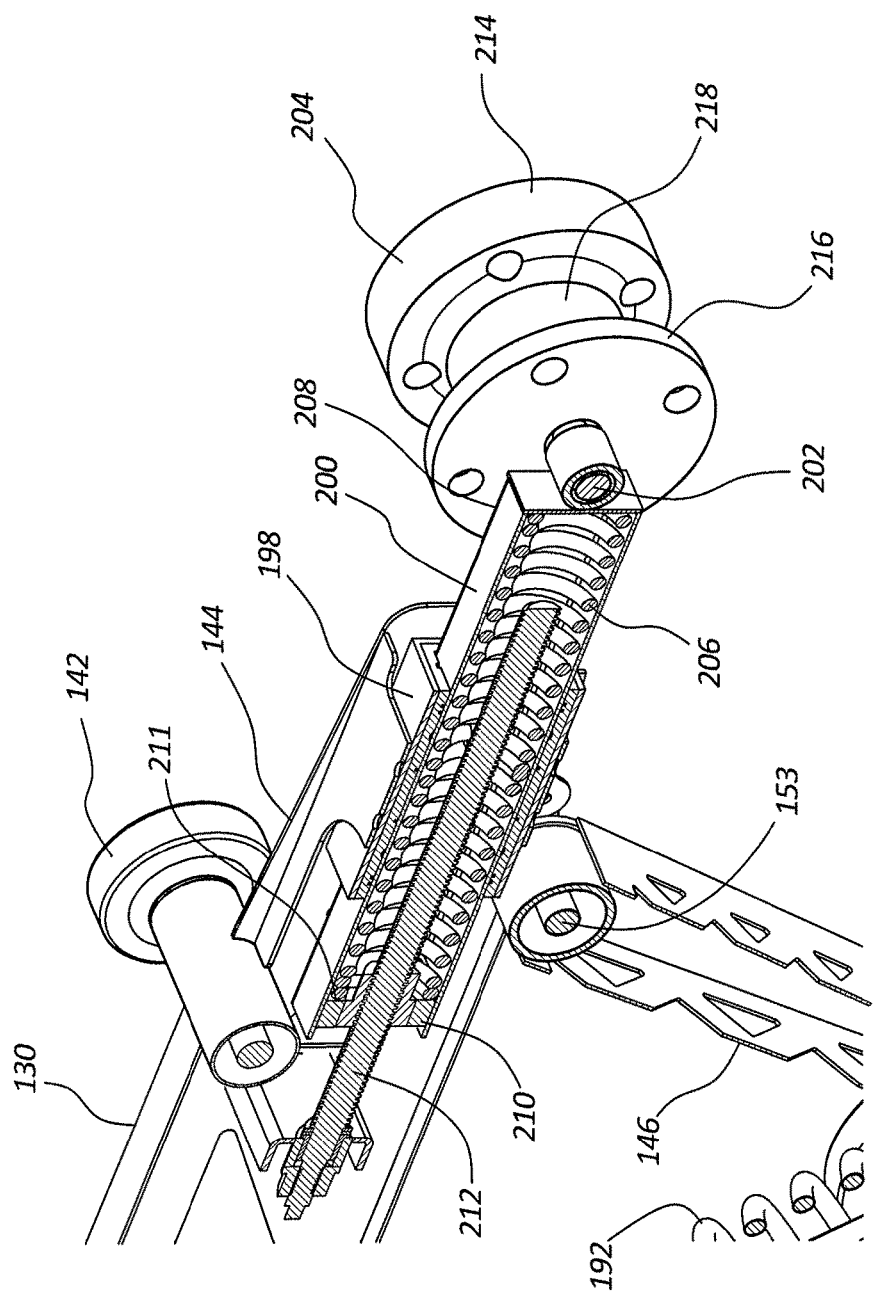
FIG. 11 is a perspective section view of the track assembly of FIG. 10 with the endless track removed.

FIGS. 10-11 are section views of track assembly 102 taken through section lines 10-10 shown in FIG. 4. FIG. 11 shows the front end of the track assembly 102 with the track 136 removed. In FIG. 10, the hinges 153 of the struts 146 can be seen, as can the hinges 186 of the shock absorbers 148. The shock absorbers 148 may include gas or hydraulic pistons 188 and cylinders 190. Collectively, the pistons 188 and cylinders 190 may be referred to as a dampening apparatus or dampening assembly. The pistons and cylinders 188, 190 may be positioned within coil springs 192 which are also part of the shock absorbers 148. The coil springs 192 may bias the bogies 150 away from the base member 130 upon compression of the pistons and cylinders 188, 190.

FIG. 10 also shows the pivotable attachment point 194 where the strut 146 connects to the shock absorber 148 and the axle of rotation 196 where the bogie 150 is pivotable relative to the strut 146. In some cases, the user may preload the springs 192 using the adjustable dampening apparatuses, thereby allowing the vehicle 100 to carry more weight or to have a different ride height. The length of the dampening apparatuses may also be a feature enabled to optimize tension in the track 136.

FIG. 10 shows the tensioning assembly 134 positioned at the front end of the track assembly 102. The tensioning assembly 134 has a guide 198 connected to the base member 130. A beam member 200 is slidably received within the guide 198. See also FIGS. 5 and 11. The front end of the beam member 200 is connected to an axle 202 for a plurality of tensioning wheels 204 positioned on opposite sides of the beam member 200. The beam member 200 may slide within the guide 198 when pressure against the tensioning wheels 204 from the track 136 presses the wheels 204 and beam member 200 toward the base member 130. Thus, the length of the beam member 200 that extends between the guide 198 and the tensioning wheels 204 or axle 202 may vary in response to a change in pressure against the tensioning wheels 204 or axle 202 by the track 136. The point at which the beam member 200 is engaged with the guide 198 may be referred to as an "engagement point" or "slidable surface" for the tensioning assembly 134.

The beam member 200 is biased away from the base member 130 (i.e., biased toward the track 136) due to the presence of a tensioning spring 206 within the beam member 200. The tensioning spring 206 may be a biasing member of any kind and is not necessarily limited to having a coil or other spring shape. The tensioning spring 206 has a first or distal end that engages a distal end 208 of the beam member 200 proximate the tensioning wheels 204 relative to its second or proximal end. The second or proximal end of the tensioning spring 206 engages a stop nut 210 and is proximate to the base member 130 or rear of the vehicle 100 relative to the first or distal end of the spring 206.

The stop nut 210 may have a stop surface 211 (i.e., support surface) contacting the second or proximal end of the tensioning spring 206. The tensioning spring 206 may be attached or affixed to the stop surface (e.g., by welding, fasteners, or adhesion), or, in some embodiments, the spring 206 may simply rest or abut the stop surface 211. The stop nut 210 may be slidable within the beam member 200 such that as the beam member 200 translates in and out of the guide 198, the stop nut 210 is stationary relative to the base member 130.

The stop nut 210 may, however, be adjustable or movable relative to the base member 130 when the user so desires. By moving the stop nut 210 toward or away from the track 136, a user may adjust the biasing force of the tensioning spring 206 and thereby adjust the tension in the track 136 via the tensioning wheels 204. A threaded rod 212 may extend through and may be threadably linked to the stop nut 210 to perform the adjustment of the position of the stop nut 210 relative to the threaded rod 212. By axially rotating the threaded rod 212, the threads of the stop nut 210 may advance axially along the threaded rod 212. As the stop nut 210 approaches the tensioning wheels 204, the force applied by the tensioning spring 206 increases, and as the stop nut 210 moves in the opposite direction, the force applied by the spring decreases. Thus, the force needed to slide the beam member 200 through the guide 198 may be adjusted by adjusting the position of the stop nut 210. In some embodiments, the threaded rod 212 may be turned for this purpose by manual adjustment, and a lock nut may be employed to keep the threading from turning inadvertently. In this manner, the proper tension to keep the track 136 attached to the track assembly 102 may be maintained as tension in the track 136 changes, whether momentarily or eventually over time.

Figure 12:
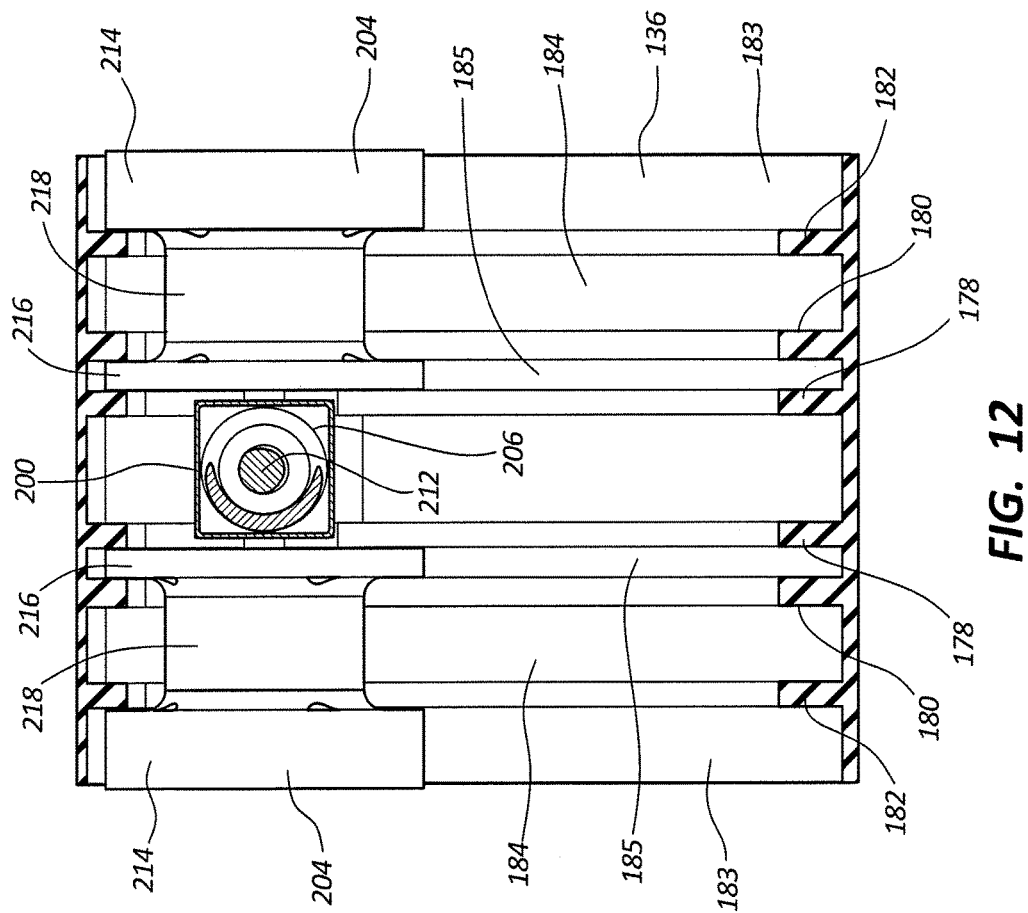
FIG. 12 is a rear section view of the track assembly taken through section lines 12-12 in FIG. 3.

The tensioning wheels 204 may be configured to roll against the inner surface of the track 136. As shown in FIGS. 11-12, the tensioning wheels 204 may include outer ridges 214 and inner ridges 216 separated by a circumferential groove 218. FIG. 12 is a rear section view (taken through section lines 12-12 in FIG. 3) that shows the tensioning wheels 204 in engagement with the track 136. FIG. 12 in particular shows how the inner ridges 216 may be seated in the grooves 185 between the innermost ridges 178 and the middle ridges 180 of the track 136. The outer ridges 214 may be seated at the periphery 183 of the inner surface 176 external to the outermost ridges 182. The circumferential groove 218 may span over the groove 184 formed by the middle ridges 180 and the outennost ridges 182, and the middle and outer ridges 180, 182 of the track 136 may be received within the circumferential groove 218. In this manner, the tensioning wheels 204 may securely retain the track 136 and limit its ability to slip from the wheels 204 as tension in the track 136 changes or is adjusted.

With reference to FIG. 14, an exploded view of the hinge 153 at an upper end 220 of a strut 146 and a lower end of a base member 130 is shown. The hinge 153 may provide the pivotable connection to the base member 130. The hinge 153 may comprise an axle 222 extending through the upper end 220 of the strut 146, a bushing 224 pressed onto and around each end of the axle 222 external to the body of the strut 146, and a bushing housing 226 positioned around the bushing 224. The bushing housing 226 may be configured with flanges 228 that have apertures 230 that align with apertures 232 in the base member 130. Thus, fasteners may be used to connect the housing 226 to the base member 130 (e.g., in the position shown by the hinges 153 in FIG. 1). In this position, the axle 222 may fit within an indentation 234 in the base member 130.

This implementation of the hinge 153 between the strut 146 and the base member 130 may provide simple maintenance of the struts 146. A strut 146 may be removed from the base member 130 by simply removing the fasteners and pulling down on the strut 146 relative to the base member 130 so that the axle 222 moves away from the indentation 234. Thus, the axle 222 does not have to be passed through the strut 146 or through an aperture in the base member 130 to remove the strut 146 from the base member 130. Additionally, the bushings 224 and their housings 226 do not need to be removed from each other in this process, so reassembly of the hinge 153 requires few steps.

The bushings 224 may be solid and greased parts that provide smooth rotation for the strut 146 and axle 222. They may also beneficially limit lateral slop of the strut 146 due to their tight fit to the axle 222 and their inner rims 236 that limit movement of the strut 146 along the longitudinal axis of the axle 222. The bushings 224 may fit within the housings 226 while greased to keep the hinge 153 sturdy and durable even under rough outdoor conditions.

Accordingly, one aspect of the disclosure relates to a method for assembling or constructing a suspension for a tracked vehicle which may include steps of providing a suspension member having an axle or other pivot point extending therethrough, providing a base member having an indentation or an opening having at least one open side, and inserting the axle into the indentation or opening by moving the axle laterally through the open side in a direction perpendicular to a longitudinal axis of the axle and/or opening (e.g., a radial direction). The method may further specify that the opening or indentation may be U-shaped or C-shaped or that it may have an internal surface that is U-shaped or C-shaped. The method may also require a bushing or bearing to be positioned on the ends of the axle, and the bushing or bearing may be seated in the indentation or opening in the base member. A bushing or bearing housing may be provided that is attached to the base member. In some embodiments, the suspension member may be a rigid strut (e.g., strut 146), and in other cases the strut may be part of a shock absorber (e.g., shock absorber 148). The method may also include attaching the axle to the base member using fasteners or attaching the axle to the base member at attachment points that are radially spaced away from the longitudinal axis of the axle (e.g., apertures 230, 232). The suspension member may be rotatable or pivotable relative to the base member upon being attached to the base member.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

What is claimed is:

1. A tracked vehicle having a pivotable suspension, the vehicle comprising:
    a vehicle frame;
    a motor configured to produce power for the vehicle;
    a left track assembly and a right track assembly each connected to the frame, the left and right track assemblies each comprising:
        a drive wheel configured to be driven by the motor;
        an endless track configured to be driven by the drive wheel, the endless track having an outer side and an inner side;
        a base member attached to the vehicle frame, the base member being elongated to extend along a length of the inner side of the endless track;
        a bogie positioned on the inner side of the endless track;
        a support wheel attached to the bogie and configured to roll on the inner side of the endless track;
        a strut connected to the base member and connected to the bogie, the strut being pivotable relative to the base member;
        a shock absorber connected to the base member and connected to the strut, the shock absorber being pivotable relative to the base member.

2. The tracked vehicle of claim 1, wherein the strut and shock absorber re configured to rotate in opposite directions upon application of a force to the bogie.

3. The tracked vehicle of claim 1, wherein the shock absorber of the left and right track assemblies comprises a dampening apparatus and a spring.

4. The tracked vehicle of claim 1, wherein the vehicle has a ride height between a bottom of the frame and a bottom of the left and right track assemblies, the ride height being adjustable by changing a length of the shock absorbers.

5. The tracked vehicle of claim 1, wherein the strut and shock absorber are movable to compliment a lead angle of the endless track.

6. The tracked vehicle of claim 1, wherein the bogie comprises a track contact surface configured to slidingly contact the inner side of the endless track.

7. The tracked vehicle of claim 6, wherein the inner side of the endless track comprises a plurality of ridges, the track contact surface contacting the inner side between two of the ridges.

8. The tracked vehicle of claim 1, further comprising a track tensioning assembly, the track tensioning assembly comprising:
    a tensioning wheel configured to roll on the inner side of the endless track;
    a beam linked to the tensioning wheel;
    a biasing member configured to bias the beam and tensioning wheel toward the inner side of the endless track;
    wherein the beam is slidingly connected to the frame of the tracked vehicle.

9. The tracked vehicle of claim 8, wherein the biasing member is positioned within the beam.

10. The tracked vehicle of claim 1, further comprising, a floatable hull positioned between the left and right track assemblies.

11. The tracked vehicle of claim 1, wherein a floatable hull is positioned between the left and right track assemblies.

12. The tracked vehicle of claim 11, wherein the floatable hull has an upper portion positioned above a water surface while floating and a lower portion positioned below the water surface while floating, wherein the endless track is positioned relative to the floatable hull with a portion of the endless track above the water surface while the floatable hull is floating.

13. The tracked vehicle of claim 1, wherein a front end of the frame connects the left and right track assemblies and a rear end of the frame connects the left and right track assemblies.

14. The tracked vehicle of claim 1, wherein the struts of the left and right track assemblies are straight.

15. A track assembly for an off-road vehicle, the track assembly comprising:
   a base member including a first side and a second side, the first and second sides being spaced apart to form a void;
   a plurality of bogies each having a plurality of support wheels;
   a plurality of suspension systems, each comprising:
      a strut having a top end portion and a bottom end portion, the top end portion being pivotally connected to the base member, the bottom end portion being connected to one of the bogies;
      a compressible shock absorber having a top end portion and a bottom end portion, the top end portion extending into the void between the first and second sides of the base member, the top end portion being pivotally connected to the base member, the bottom end portion being connected to the strut;
   an endless track extending around at least the plurality of support wheels and the bogies.

16. The track assembly of claim 15, wherein the plurality of bogies contact the endless track.

17. The track assembly of claim 16, wherein the plurality of bogies comprise a first material and a second material, the first material contacting the endless track, the second material forming a core within the first material.

18. The track assembly of claim 15, wherein the plurality of bogies are positioned between ridges formed along an inner surface of the endless track.

19. The track assembly of claim 15, wherein the shock absorbers are configured to bias the bogies toward the endless track.

20. The track assembly of claim 15, further comprising a tensioning apparatus, the tensioning apparatus comprising:
   a tensioning wheel configured to roll in contact with the endless track;
   a tensioning arm attached to the tensioning wheel and to the base member of the track assembly, the tensioning arm having a length defined between an attachment point at the tensioning wheel and an engagement point at the base member;
   wherein the length of the tensioning arm is variable in response to a change in pressure against the tensioning wheel by the endless track.

21. The track assembly of claim 20, wherein the tensioning apparatus comprises a biasing member configured to apply a biasing force to the tensioning wheel toward the endless track.

22. The track assembly of claim 21, wherein the biasing force is adjustable.

23. A track assembly for an off-road vehicle, the track assembly comprising:
   a base member;
   a plurality of support wheels connected to the base member;
   an endless track in contact with the plurality of support wheels;
   a tensioning wheel configured to roll in contact with the endless track;
   a tensioning arm attached to the tensioning wheel and to the base member, the tensioning arm having a length defined between an attachment point at the tensioning wheel and an engagement point at the base member;
   a threaded rod operably connected to a movable stop surface, the threaded rod being connected to the base member, the movable stop surface being configured to move relative to the threaded rod in response to rotation of the threaded rod;
   wherein the length of the tensioning arm between the attachment point and the engagement point is variable in response to a change in pressure against the tensioning wheel by the endless track.

24. The track assembly of claim 23, further comprising a biasing member configured to apply a biasing force to the tensioning wheel toward the endless track.

25. The track assembly of claim 24, wherein the biasing force is adjustable, by rotating the threaded rod.

26. The track assembly of claim 24, wherein the biasing member has a first end portion and a second end portion, the first end, portion being proximate the tensioning wheel relative to the second end portion, the second end portion contacting the movable stop surface.

27. The track assembly of claim 23, wherein the tensioning wheel comprises a first tensioning wheel and a second tensioning wheel, the first tensioning wheel being positioned on a first side of the tensioning arm, the second tensioning wheel being positioned on a second side of the tensioning arm, the second side being opposite the first side.

28. The track assembly of claim 23, wherein the tensioning wheel comprises a circumferential groove and the endless track comprises at least one ridge, the at least one ridge being positioned within the circumferential groove.

* * * * *